UNITED STATES PATENT OFFICE.

FRIEDRICH RASCHIG, OF LUDWIGSHAFEN-ON-THE-RHINE, GERMANY.

TAR-PAINT AND PROCESS OF MANUFACTURE.

1,049,916.  Specification of Letters Patent.  Patented Jan. 7, 1913.

No Drawing.  Application filed July 5, 1910. Serial No. 570,314.

*To all whom it may concern:*

Be it known that I, FRIEDRICH RASCHIG, a subject of the German Emperor, residing at Ludwigshafen-on-the-Rhine, Germany, have invented a certain new and useful Improved Tar-Paint and Process for Its Manufacture, of which the following is a specification.

It is well-known, that various kinds of tar, such as coal-tar, wood-tar, oil-gas-tar, are extensively used as a protective paint or coating for metal and other surfaces. This method of application, however, has the defect, that the objects to be coated or protected must be perfectly dry, otherwise they fail to unite with tar. Moreover, if the tar is very thick or viscous, it must be rendered more liquid by heating, which is usually attended with danger from fire, or it must be mixed with organic solvents, whereby the expense of the process is considerably increased. I have found, that these defects may be avoided by preparing an emulsion of tar with clay, for instance by stirring 200 kilograms of unctuous china-clay together with about 100 kilos of water in a suitable mixing machine, and then gradually adding about 500 kilos of tar and 200 kilos of water, while constantly stirring, until the tar has been uniformly distributed.

As the emulsion may be diluted to any desired degree by the addition of water, it is possible to prepare in this manner easily a very liquid paint, which may be applied with the brush at ordinary temperature. As this emulsion contains water, it adheres to various kinds of moist surfaces, such as iron, stone, cardboard and wood, and the paint or coating has the property characteristic of clay-tar emulsion, that after drying, it is no longer absorbed by water. The paint is therefore perfectly weather-proof and owing to the presence of clay, it possesses the following valuable properties. Unlike ordinary tar-coatings, it will not soften at high temperature, and consequently not flow off, while tarred roofing gradually loses the major part of its tar-coating, when exposed to the heat of the sun. Moreover, the tar-clay paint is far less combustible, and woodwork or roofing coated with it will therefore propagate fire very slowly.

What I claim is:—

1. A protective paint consisting of an emulsion of tar, clay and water.

2. The process for the manufacture of a protective paint, which consists in mixing clay with water and then gradually stirring into the mixture tar and water, until the tar is uniformly distributed.

In testimony whereof I have hereunto set my hand in presence of two subscribing witnesses.

FRIEDRICH RASCHIG.

Witnesses:
 ROBERT GCRLERCHS,
 RICH REURELE.